L. P. HALLADAY.
ADJUSTABLE SUPPORT FOR AUTOMOBILE BUMPERS.
APPLICATION FILED FEB. 18, 1918.
1,277,343.
Patented Aug. 27, 1918.
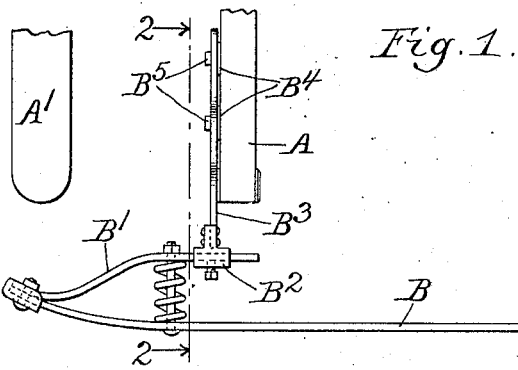
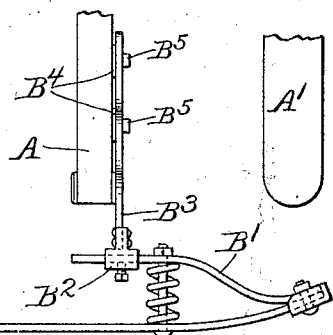
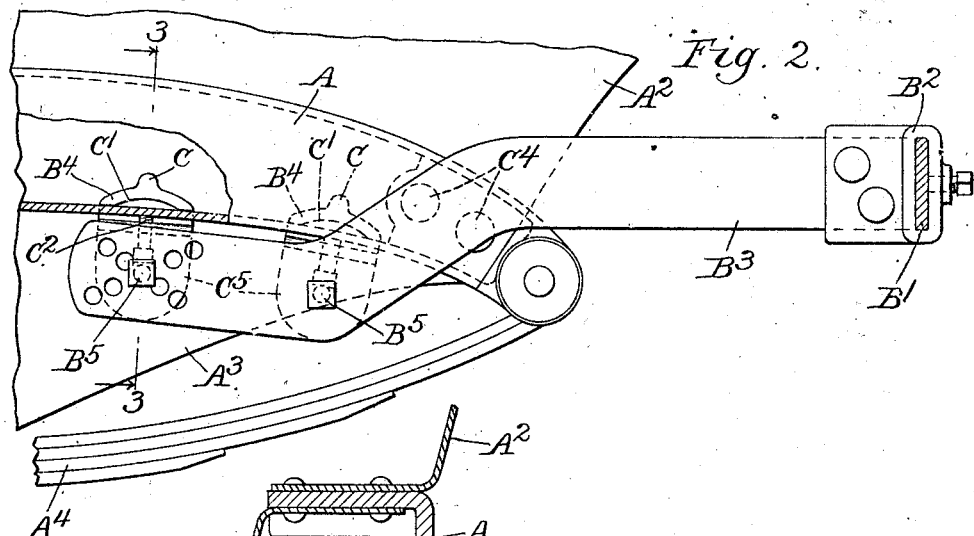
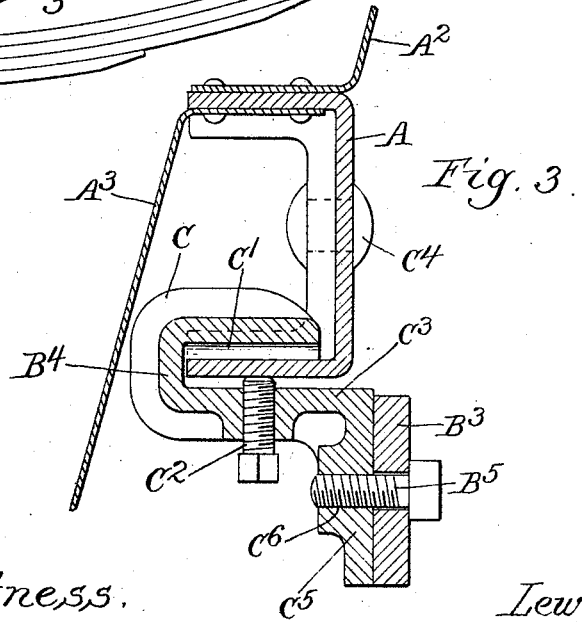
Witness.
Edward F. Wray
Inventor.
Lewis P. Halladay,
by Peters & Carter
Attorneys.

UNITED STATES PATENT OFFICE.

LEWIS P. HALLADAY, OF STREATOR, ILLINOIS.

ADJUSTABLE SUPPORT FOR AUTOMOBILE-BUMPERS.

1,277,343.  Specification of Letters Patent.  Patented Aug. 27, 1918.

Application filed February 18, 1918. Serial No. 217,798.

*To all whom it may concern:*

Be it known that I, LEWIS P. HALLADAY, a citizen of the United States, residing at Streator, in the county of La Salle and State of Illinois, have invented a certain new and useful Improvement in Adjustable Supports for Automobile-Bumpers, of which the following is a specification.

My invention relates to improvements in adjustable supports for automobile bumpers particularly for use in connection with those types of modern automobiles wherein the splash pan or mud guard extends downwardly from the top of the horn of the frame and leaves only the lower flange of the frame clear for attachment of the supports, though obviously my device might be used under different circumstances. One object of my invention is to provide a new and improved form of universal bumper support which may be used in connection with a large number of different types of automobiles. Another object is to provide a bumper support which will be cheap, light, easy to manufacture and easy to install, and which when installed will be rigid and durable and subject to a minimum of distortion and displacement. Other objects of my invention will appear from time to time in the specification.

The invention is illustrated more or less diagrammatically in the accompanying drawings wherein—

Figure 1 is a plan view of the front end of an automobile showing my device installed;

Fig. 2 is a detail enlarged section along the line 2—2 of Fig. 1;

Fig. 3 is a further enlarged section along the line 3—3 of Fig. 2.

Like parts are indicated by like letters in all the figures.

A A are parallel front outwardly inclined frame ends or horns of a motor vehicle frame. The remaining parts of the vehicle except the forward portion of the front wheels $A^1$ $A^1$ are not illustrated because they form no part of my present invention. These frame ends or horns are of channeled cross section as indicated in Fig. 3 and the upper flange carries mud or dust guards $A^2$ $A^3$ which are so disposed that if the bumper is to be fastened to the frame either the mud guard must be cut away or else some special fitting must be used. These mud guards extend down between the frame horns and overhang the vehicle springs $A^4$ in the usual manner.

B is a bumper bar of any suitable kind shown in this instance as having rearwardly extending brackets $B^1$ adjustable in sockets $B^2$ which sockets are rigidly mounted on the ends of forwardly extending supporting bars $B^3$. $B^4$ $B^4$ are two separate preferably identical clamps adapted to engage the lower flange of the vehicle frame at separate points and to be rigidly and strongly attached or clamped thereto independent of each other and of the other parts of the bumper. The bar $B^3$ extends rearwardly and is attached to each of these clamps by cap screws $B^5$ passing through perforations in the supporting bar. As I have shown it the forward cap screw $B^5$ provides a pivot, and the rear cap screw may pass through a number of different holes whereby the height of the bumper may be controlled.

A description of one of the clamps will suffice for all. The clamp is U-shaped as indicated in section in Fig. 3. It has a reinforcing flange C and is curved at $C^1$ in Fig. 2, so that there are two parallel lines of contact between the clamp face and the flange. These two parallel lines of contact are drawn against the flange by a set screw $C^2$ engaging the opposed side of the frame flange thus giving a so-called three point support. The tail of the clamp extends outwardly as at $C^3$ beyond the frame and beyond the rivet heads $C^4$ which form a part of all automobile frames. This tail terminates in a broad reinforcing platform $C^5$ and this platform is centrally perforated and screw-threaded at $C^6$ to engage a cap screw $B^5$ so that when the two cap screws are drawn up the bumper supporting bars are rigidly fastened on the clamp platforms and held out beyond the wall of the frame so as to clear the rivets.

It will be evident that while I have shown in my drawings an operative device still many changes might be made in size, shape and arrangement of parts without departing materially from the spirit of my invention and I wish therefore that my drawings be regarded as in a sense diagrammatic.

The use and operation of my invention are as follows:—

The operator who is about to install my bumper places preferably the two forward clamps in position on the frame at some suitable place near the front end. He then tightens up on the set screws to clamp and lock these two in position. It makes no difference what the curvature is there is no rocking of the clamp with respect to the flanges because there are only three points of engagement with the frame and these three determine the arc of a circle and are located by the curvature of the frame. The operator then places the rear clamps loosely in position. He may or may not tighten up on the set screw to hold them in place. He then places the bumper arms in position inserting the cap screw in the forward holes and the arms are thus pivoted on the front clamps. He then moves the rear clamp into the position such that it engages the end of the bumper support, screws in the set screw into one of the holes and if he has guessed right when the parts are tightened up the bumper bar will be at the proper height, if not he must change the set screw into another hole in the bar support either higher or lower as the case may be. While doing this it may be necessary for him to move the clamp back and forth a little to accommodate different positions of the holes and this can easily be done if the clamp is not tightened up too tight. Once the proper adjustment has been made the parts may be jammed tight, all the screws and bolts tightened to the limit and the parts will stay where put. It makes no difference where the pressure comes on the bumper the two clamps holding the supports rigidly hold them in place and there is no possibility of displacement of any of the parts and friction is nowhere relied on to hold the parts in position except in connection with the clamps on the frame and these may be made so tight that they bit into the frame itself and so there is no danger of their being displaced.

I claim:—

1. A support for automobile bumpers comprising a bar extending forwardly from the vehicle frame, a plurality of clamping members rigidly attached to the frame and means for separately attaching the supporting bar to each of said members independent of the means for fastening the members to the frame.

2. A support for automobile bumpers, comprising a bar extending forwardly from the vehicle frame, a plurality of clamping members rigidly attached to the frame and means for separately attaching the supporting bar to each of said members independent of the means for fastening the members to the frame, said members being movable for adjustment along the frame when the holding means are released independent of the forwardly extending bar.

3. A support for automobile bumpers comprising a plurality of separate independent support members and means for rigidly and independently fastening them on the frame, a bar extending forwardly from the frame and means for separately fastening said bar to each of said members, the means for fastening the members to the frame and for fastening the bar to the members being entirely independent.

4. A support for automobile bumpers comprising a bar, a plurality of clamps separately and independently mounted on the vehicle frame, said clamps projecting outwardly beyond the frame and separate means for attaching a bar to said clamps, said bar being widely removed from the frame.

5. A support for automobile bumpers comprising a bar, a plurality of clamps separately and independently mounted on the vehicle frame, said clamps projecting outwardly beyond the frame and separate means for attaching said bar to said clamps, said bar being widely removed from the frame, the means for attaching the clamps to the frame and the bar to the clamps being altogether independent.

6. A clamp for supporting automobile bumpers comprising a U-shaped member adapted to inclose one of the flanges of an automobile frame, means for locking said U-shaped member upon the frame and means for separately attaching a supporting bar to said clamp, one face of said U-shaped member being concave to give a two-point engagement of the frame on one side in opposition to the clamp holding means.

7. A clamp for supporting automobile bumpers comprising a U-shaped member adapted to inclose one of the flanges of an automobile frame, means for locking said U-shaped member upon the frame and means for separately attaching a supporting bar to said clamp, the clamp having an enlarged plane bearing surface removed from the frame to engage the supporting bar.

8. A clamp for supporting automobile bumpers comprising a U-shaped member adapted to inclose one of the flanges of an automobile frame, means for locking said U-shaped member upon the frame and means for separately attaching a supporting bar to said clamp, one face of said U-shaped member being concave to give a two-point engagement of the frame on one side in opposition to the clamp holding means, the clamp having an enlarged bearing surface removed from the frame to engage the supporting bar.

9. A clamp for supporting automobile bumpers comprising a U-shaped member adapted to inclose one of the flanges of an auto frame, means for locking said U-shaped member upon the frame, means for separately attaching a supporting bar to said clamp, and an enlarged bearing surface, integral with said U-shaped member, against which said supporting bar bears.

10. A clamp for supporting automobile bumpers comprising a U-shaped member adapted to inclose one of the flanges of an auto frame, means for locking said U-shaped member upon the frame, means for separately attaching a supporting bar to said clamp, and an enlarged plane bearing surface integral with said U-shaped member, against which said supporting bar bears.

11. A clamp for supporting automobile bumpers comprising a U-shaped member adapted to inclose one of the flanges of an auto frame, means for locking said U-shaped member upon the frame, means for separately attaching a supporting bar to said clamp, and an enlarged bearing surface integral with said U-shaped member against which said supporting bar bears, said bearing surface depending from the U-shaped member.

12. A clamp for supporting automobile bumpers comprising a U-shaped member adapted to inclose one of the flanges of an auto frame, means for locking said U-shaped member upon the frame, means for separately attaching a supporting bar to said clamp, and an enlarged plane bearing surface integral with said U-shaped member against which said supporting bar bears, said bearing surface depending from the U-shaped member.

13. A clamp for supporting automobile bumpers comprising a U-shaped member adapted to inclose one of the flanges of an auto frame, means for locking said U-shaped member upon the frame, means for separately attaching a supporting bar to said clamp, and an enlarged bearing surface, integral with said U-shaped member against which said supporting bar bears, said bearing surface forming approximately a right angle with the flange to which the clamp is secured.

14. A clamp for supporting automobile bumpers comprising a U-shaped member adapted to inclose one of the flanges of an auto frame, means for locking said U-shaped member upon the frame, means for separately attaching a supporting bar to said clamp, and an enlarged bearing surface integral with said U-shaped member against which said supporting bar bears, said bearing surface depending from the U-shaped member and forming approximately a right angle with the flange to which the clamp is secured.

15. A clamp for supporting automobile bumpers comprising a U-shaped member adapted to inclose one of the flanges of an auto frame, means for locking said U-shaped member upon the frame, means for separately attaching a supporting bar to said clamp, and an enlarged bearing surface removed from the frame, integral with said U-shaped member against which said supporting bar bears, said bearing surface forming approximately a right angle with the flange to which the clamp is secured.

16. A clamp for supporting automobile bumpers comprising a U-shaped member adapted to inclose one of the flanges of an automobile frame, means for locking said U-shaped member upon the frame, means for separately attaching a supporting bar to said clamp, and an enlarged bearing surface depending from the U-shaped member integral with said U-shaped member against which said supporting bar bears, said bearing surface forming approximately a right angle with the flange to which the clamp is secured.

17. In an automobile bumper, a supporting bar extending forwardly from the frame, a clamping member rigidly attached to the frame, means for pivoting the supporting bar thereon, a second clamping member rigidly attached to the frame, separate adjustable means for attaching the supporting bar directly thereto.

18. In an automobile bumper, a supporting bar extending forwardly from the frame, a forward clamping member rigidly attached to the frame, means for pivoting the supporting bar thereon, a rearward clamping member rigidly attached to the frame, separate adjustable means for attaching the supporting bar directly thereto.

19. In an automobile bumper, a supporting bar extending forwardly from the frame, a forward adjustable clamping member rigidly attached to the frame, means for pivoting the supporting bar thereon, a rearward adjustable clamping member rigidly attached to the frame, separate adjustable means for attaching the supporting bar directly thereto.

20. In an automobile bumper, a supporting bar extending forwardly from the frame, a clamping member rigidly attached to the frame, means for pivoting the supporting bar thereon, a second clamping member rigidly attached to the frame, adjustable means for attaching the supporting bar thereto, said means comprising a screw threaded perforation in the clamping member, a plurality of perforations in the supporting bar, and a screw adapted to engage the screw-threaded perforation, and secure the supporting bar to the clamping member.

21. A clamp for supporting automobile bumpers comprising a U-shaped member adapted to inclose one of the flanges of an automobile frame, means for locking said U-shaped member upon the frame, and means for separately attaching a supporting bar to said clamp, the clamp having an enlarged laterally disposed exposed bearing surface removed from the frame to engage the supporting bar.

22. In an automobile bumper, a supporting bar extending forwardly from the frame, a clamping member rigidly attached to the frame, means for pivoting the supporting bar thereon, a second clamping member rigidly attached to the frame, adjustable means for attaching the supporting bar thereto, said means comprising a perforation in the clamping member, a plurality of perforations in the supporting bar, and a holding member adapted to engage the aperture in the clamping member, and an aperture in the supporting bar to secure the supporting bar to the clamping member.

23. In an automobile bumper, a supporting bar extending forwardly from the frame, a clamping member rigidly attached to the frame, means for pivoting the supporting bar thereon, a second clamping member rigidly attached to the frame, adjustable means for attaching the supporting bar thereto, said means comprising a plurality of perforations in the supporting bar, and a holding member attached to the clamp, adapted to engage said perforations and secure the supporting bar to the clamping member.

24. In an automobile bumper, a supporting bar extending forwardly from the frame, a clamping member rigidly attached to the frame, means for pivoting the supporting bar thereon, a second clamping member rigidly attached to the frame, adjustable means for attaching the supporting bar thereto, said means comprising a plurality of perforations in the supporting bar, and a holding member attached to the clamp, adapted to engage said perforations and secure the supporting bar to the clamping member, said perforations arranged along a plurality of axes.

25. In an automobile bumper, a supporting bar extending forwardly from the frame, a clamping member rigidly attached to the frame, means for pivoting the supporting bar thereon, a second clamping member rigidly attached to the frame, adjustable means for attaching the supporting bar thereto, said means comprising a plurality of perforations in the supporting bar, and a holding member attached to the clamp, adapted to engage said perforations and secure the supporting bar to the clamping member, said perforations arranged along a plurality of intersecting axes.

In testimony whereof, I affix my signature in the presence of two witnesses this 7th day of February 1918.

LEWIS P. HALLADAY.

Witnesses:
G. G. HOOD,
E. R. WILLIAMS.